United States Patent
Goff et al.

(10) Patent No.: US 6,337,910 B1
(45) Date of Patent: Jan. 8, 2002

(54) METHOD AND APPARATUS FOR GENERATING ONE TIME PADS SIMULTANEOUSLY IN SEPARATE ENCRYPTION/DECRYPTION SYSTEMS

(75) Inventors: Lonnie C. Goff, Tempe; Steve Cornelius, Gilbert, both of AZ (US)

(73) Assignee: Koninklijke Philips Electronics N.V. (KPENV), Eindhoven (NL)

( * ) Notice: Subject to any disclaimer, the term of this patent is extended or adjusted under 35 U.S.C. 154(b) by 0 days.

(21) Appl. No.: 09/150,119

(22) Filed: Sep. 9, 1998

(51) Int. Cl.[7] .................................................. H04L 9/04
(52) U.S. Cl. ........................... 380/28; 255/259; 255/44; 255/260; 255/281; 255/29; 255/30; 713/168; 713/181
(58) Field of Search ................................ 380/255, 259, 380/44, 260, 281, 29, 28, 30; 713/168, 181

(56) References Cited

U.S. PATENT DOCUMENTS

| | | | | |
|---|---|---|---|---|
| 4,218,582 A | * | 8/1980 | Hellman et al. ............... | 178/22 |
| 4,969,189 A | * | 11/1990 | Ohta et al. ..................... | 380/25 |
| 5,848,159 A | * | 12/1998 | Collins et al. ................. | 380/30 |

OTHER PUBLICATIONS

U.S. Pat. Application No. 09/150,120, filed Sep. 9, 1998, for Cornelius et al.

* cited by examiner

Primary Examiner—Thomas R. Peeso
Assistant Examiner—Todd Jack

(57) ABSTRACT

A method for simultaneously generating one time pads and an apparatus which implements the method to produce a secure encryption system. The method and apparatus use the Diffie-Hellman key exchange algorithm to produce a one time pad rather than exchange keys. This makes it practical to generate one time pads for use in secure transmissions.

20 Claims, 2 Drawing Sheets

METHOD AND APPARATUS FOR GENERATING ONE TIME PADS SIMULTANEOUSLY IN SEPARATE ENCRYPTION/DECRYPTION SYSTEMS

RELATED APPLICATIONS

This application is related to co-pending U.S. Pat. application Ser. No. 09/150,120, filed on Sep. 9, 1998, entitled "A HYBRID ONE TIME PAD ENCRYPTION AND DECRYPTION APPARATUS WITH METHODS FOR ENCRYPTING AND DECRYPTING DATA" (VLSI.256PA). The disclosure of the above referenced application is incorporated by reference into this application.

FIELD OF THE INVENTION

This invention relates generally to apparatus and methods for encryption and decryption of digital messages or file representations, more specifically, to an apparatus and method using a hybrid scheme for encrypting and decrypting a high security encrypted message or file representation using a one time random number pad where the pad is generated at both the encrypting and decryption stations.

BACKGROUND OF THE INVENTION

Encryption and decryption devices are desired within the communications industry. As reliance on electronic banking, Internet e-mail and other purely electronic communications increase, there is an increasing need for secure communications which cannot be broken, even with high computation power and heavy investments in technology.

This need is presently being filled by such algorithms as DES (Data Encryption Standard) and RSA (Rivest-Shamir-Adleman) encryption techniques. For the purpose of discussion, these will be referred to as "short key" techniques. While these techniques are robust and allow for variable keys, they are still potentially subject to defeat by application of repetitive analysis to decode the cipher which is cycled many times in a typical message.

A technique which is hypothetically undefeatable is the one time pad technique. Unfortunately it is also impractical in its application. The one time pad technique uses a pad which is a perfectly random set of numbers the same size as the message transmitted. This pad is combined with the message data (typically by an exclusive-OR operation) to produce the encrypted data. Since the pad is truly random, there is no relationship of the output data from this operation to the input data that was provided. The impracticality of the one time pad technique stems from several factors: 1) The encrypted data and pad are twice as large as the original message; and 2) The security requirement for the pad is as great as the security requirement of the message; 3) The recipient needs the pad to decode the message; and 4) The pad can only be used once or repetitive analysis could reveal the pad.

The above referenced co-pending patent application determined that in order to use a one time pad in a practical application, a means to transmit the pad in a fashion as secure as the message itself is needed and that a method is also needed so that the recipient does not have to have foreknowledge of the pad in order to decode the message. It is also possible to not transmit the pad, but generate the pad simultaneously at two locations.

SUMMARY OF THE INVENTION

The present invention addresses the above-mentioned and other needs by creating a method and apparatus for generating a one time pad simultaneously at two locations. The Diffie-Hellman algorithm is used, as suggested by the above referenced co-pending patent application, but here the algorithm is not used to exchange a key, but to generate the same one time pad at the transmitting and receiving stations by exchanging pad recipes. These pad recipes are numbers which can be used to compute a pad that is common between multiple stations. Once the recipes from other locations are known, a pad is computed using a locally generated random number and the received recipes.

The Diffie-Hellman key exchange algorithm is well known to those familiar with the art as a method for passing encryption keys between two locations. A number which is common to both locations g, is raised to a different random power x and y, at each location and divided by a prime number field p. The remainder of that division comprises the recipe that is shared with other locations. The result of this computation $g^x$ mod p or $g^y$ mod p is then passed to the other locations. At each location, the received value is then raised to the same random power x and y that was used in the making of the key that was passed to the other location. This results in a number at each location that is equal to $g^{xy}$ mod p. This common number can then be used to encode data and no interception of the transmission $g^x$ and $g^y$ allows for the computation of $g^{xy}$ mod p. This provides for a secure means for sharing a common key between multiple locations. In this invention, it is not a key that is passed between locations but a number which is used to compute the one time pad.

The present invention is directed to encrypting and decrypting messages. According to one example embodiment of the present invention, messages are encrypted and decrypted using a one-time pad that is not transmitted. In another example embodiment of the present invention, a one-time pad is generated simultaneously at two or more locations in a manner that includes computing the one time pad as a function of a recipe and a local secret random number field.

In accordance with one embodiment of the present invention, an apparatus for generating a one time pad in multiple locations is disclosed. The apparatus computes a recipe according to the method below, transmits the recipe and receives a recipe from at least one other location. It then computes the one time pad according to the method described below.

In accordance with another embodiment of the present invention, a method for generating a one time pad at multiple locations simultaneously is disclosed. A random number is generated at each location and used to raise a primitive number of a prime field which is known at all locations to the power of the generated random number. Then the generated number is divided by the prime field which is also known at all locations. The remainder of this division is passed to the other locations as a recipe for a one time pad.

The one time pad is generated for communication with a location by taking the recipe received from that location and raising it to the power of the locally generated random number that was used to make the recipe that this location transmitted to other locations. The result of this exponentiation is then divided by the known prime field and the remainder is used as a one time pad or is used to further compute a one time pad.

The foregoing and other objects, features, and advantages of the invention will be apparent from the following, more particular, description of the preferred embodiment of the invention, as illustrated in the accompanying drawings.

DETAILED DESCRIPTION OF THE PREFERRED EMBODIMENT

Figure 2:
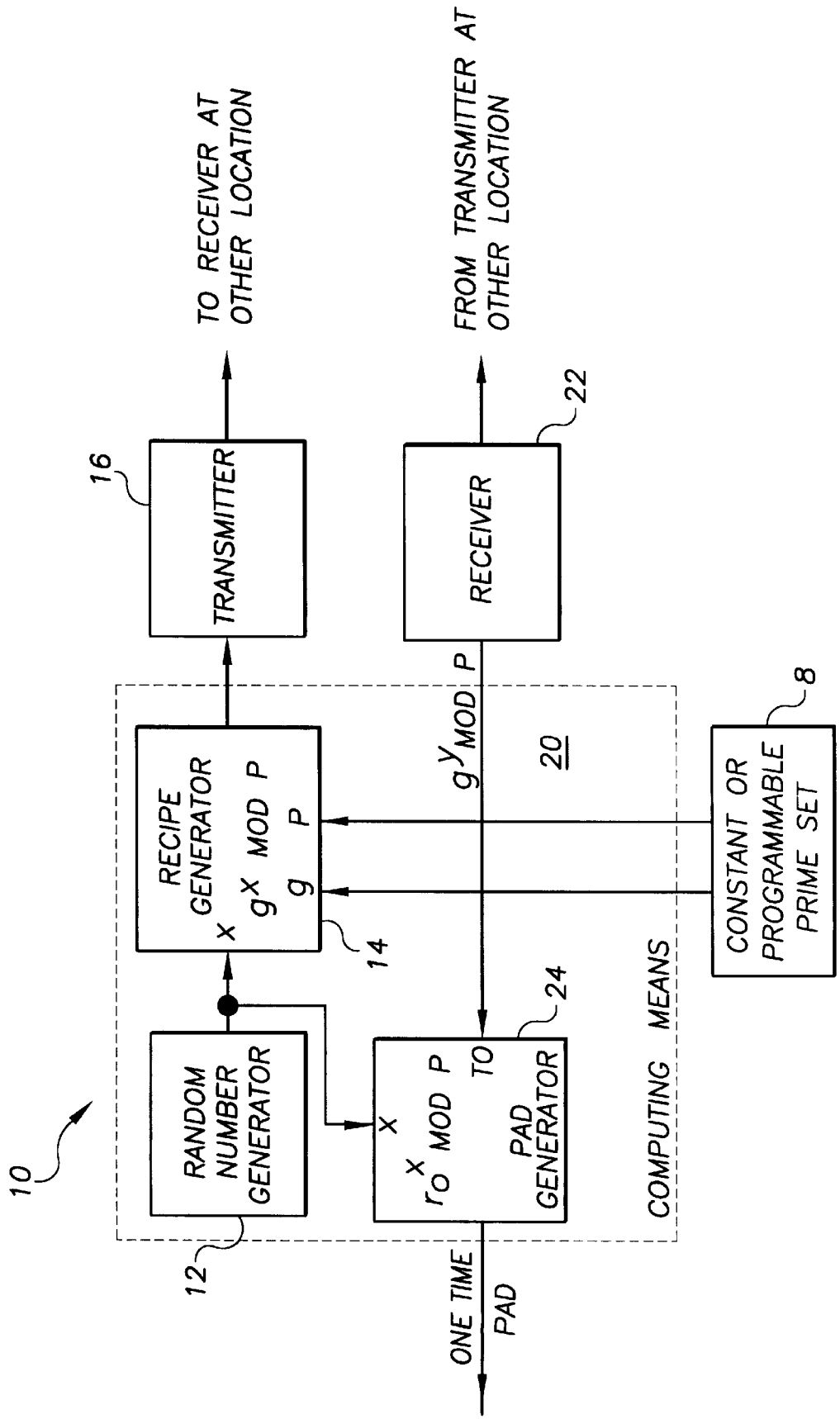
FIG. 2 is a simplified block diagram of the apparatus for producing a one time pad.

Referring to FIG. 2 the apparatus 10 for generating one time pads simultaneously at multiple locations is shown. A Random Number Generator 12 may be a physically separate component or part of a general computing means 20 which encompasses or provides all the computing and/or processing functions of the apparatus 10. One output of the Random Number Generator 12 is provided as an input to a Recipe Generator 14. This Recipe Generator 14 exponentiates an input number "g" to the output of the Random Number Generator 12, "x" and divides this result by input number "p". These input numbers "g" and "p" can be constants hardwired within the computing means 20 or may be programmable or may also be constants provided by a Constant Or Programmable Prime Set 18.

The output of the Recipe Generator 14 provides an input to a Transmitter 16 which sends or transmits the recipe to other devices. The Receiver 22 receives recipes from the other apparatus. Pad Generator 24, located within the computing means 20, uses the received recipe to compute or generate the one time pad. The Pad Generator 24 computes the one time pad by taking the recipe "$r_o$" received from the Receiver 22 and raising the recipe "$r_o$" to the power of input "x" which is provided as an output by the Random Number Generator 12.

Figure 1:
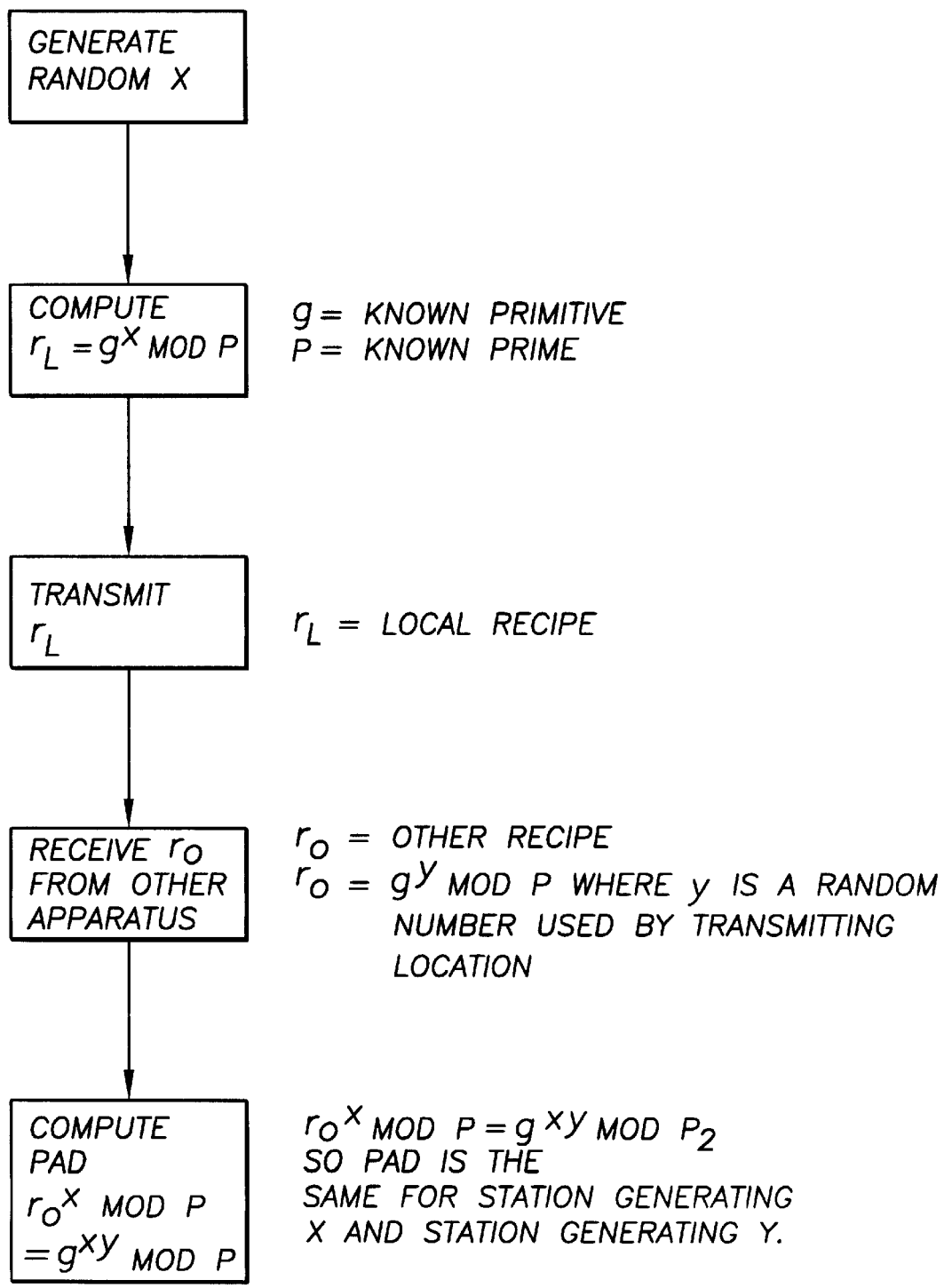
FIG. 1 is a simplified flow diagram of the method for producing a one time pad.

Referring to FIG. 1, the method for generating one time pads at multiple locations simultaneously is described. A random number "x" is generated and is used to raise a known primitive number "g" to the power of that random number "x". The result is divided by number "p" to produce a recipe $r_L$. This recipe is transmitted to other locations.

To compute the one time pad that will be used to encrypt data, the recipe received from another location $r_o$ is raised to the power of the random number "x" that was generated and the result divided by the same prime number "p" that was used in generating both recipes. The resulting number is $g^{xy}$ mod p where "y" is the random number that was generated at the other location. Thus, the computed result will be the same for both locations and can be used directly as a one time pad or a further computation which is identical at both locations can be performed. The pad value is typically combined in an Exclusive OR operation with the data to be encrypted.

The recipe and one time pad can be further complicated by the inclusion of the parameters into an additional functional expression. However, in the preferred embodiment such a functional expression is simply the identity operator.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. An apparatus for secretly constructing a common one time pad at a plurality of stations, comprising, in combination:

means for generating a large random number;

means, coupled to the generating means, for computing a recipe according to the formula r=F ($g^x$ mod p); wherein:

r is the recipe;

g is a primitive mod p;

p is a large prime number;

x is a random number generated by the means for generating a large random number; and F is a function for further computing the recipe; and means for transmitting said recipe coupled to the computing means.

2. The apparatus in accordance with claim 1, wherein F is an identity operator.

3. The apparatus in accordance with claim 2 further comprising receiving means for receiving at least one other recipe from at least one other location.

4. The apparatus in accordance with claim 3 wherein said computing means further computes the one time pad according to the formula:

$$Q=G(r^x \bmod p)$$

wherein:

Q is the one time pad;

r is the at least one other recipe;

x is the generated large random number;

p is the prime number; and

G is a function for further computing said one time pad.

5. The apparatus in accordance with claim 4 wherein G is an identity operator.

6. The apparatus for generating a one time pad in accordance with claim 4 further comprising receiving means for receiving at least one other recipe from at least one other location.

7. The apparatus in accordance with claim 1 further comprising means for receiving the recipe.

8. The apparatus in accordance with claim 1 further comprising a constant or programmable prime set.

9. A method for secretly constructing a common one time pad at a plurality of stations, comprising the steps of:

generating at least one random number;

computing at least one recipe using the at least one random number, the recipe being computed according to the formula r=F ($g^x$ mod p); wherein:

r is the recipe;

g is a primitive mod p;

p is a large prime number;

x is the generated random number; and

F is a function for further computing the recipe;

transmitting said at least one recipe from a first station to at least one other station;

computing the one time pad from the at least one recipe at the at least one other station;

generating at least one second random number at the at least one other station;

computing at least one second recipe from the at least one second random number;

transmitting the at least one second recipe from the at least one other station to the first station; and computing the one time pad from the at least one second recipe at the first station.

10. The method in accordance with claim 9, wherein the step of computing the one time pad from the at least one other recipe at the at least one other location comprises the steps of:

raising the at least one other recipe to the at least one random number at the first location to produce a first pad result; and computing the one time pad from the first pad result at the first location.

11. The method in accordance with claim 9 wherein the step of computing the one time pad from the at least one other recipe at the at least one other location comprises the steps of:

raising the at least one other recipe to the at least one random exponent at the first location to produce a first pad result; and computing the one time pad from the first pad result at the first location; and wherein the step of computing the one time pad from the at least one second recipe at the first location comprises the steps of:

raising the at least one second recipe to the at least second one random exponent at the at least one other location to produce a second pad result; and computing the one time pad from the second pad result at the at least one other location.

12. The method in accordance with claim 9 wherein the step of computing the one time pad from the first pad result at the first location comprises dividing the first pad result by a large prime number and taking the remainder.

13. A method for secretly constructing a common one time pad at a plurality of station, comprising the steps of:

generating at least one random number;

computing at least one recipe from said at least one random number;

transmitting said at least one recipe from a first station to the at least one other station;

computing the one time pad from the at least one recipe at the at least one other location;

generating at least one second random number at the at least one other location;

computing at least one second recipe from the at least one second random number;

transmitting the at least one second recipe from the at least one other location to the first location; and computing the one time pad from the at least one second recipe at the first location wherein the step of computing the one time pad from the first pad result at the first location includes the steps of:

dividing the first pad result by the large prime number; taking the remainder; and further computing the one time pad from the remainder.

14. The method in accordance with claim 9, wherein:

the step of computing the one time pad from the first pad result at the first location comprises dividing the first pad result by the large prime number and taking the remainder; and the step of computing the one time pad from the at least one other pad result at the at least one other location comprises dividing the at least one other pad result by the large prime number and taking the remainder.

15. A method for secretly constructing a common one time pad at a plurality of station, comprising the steps of:

generating at least one random number;

computing at least one recipe from said at least one random number;

transmitting said at least one recipe from a first station to the at least one other station;

computing the one time pad from the at least one recipe at the at least one other location;

generating at least one second random number at the at least one other location;

computing at least one second recipe from the at least one second random number;

transmitting the at least one second recipe from the at least one other location to the first location; and computing the one time pad from the at least one second recipe at the first location wherein the step of computing the one time pad from the first pad result at the first location comprises the steps of:

dividing the first pad result by the large prime number; taking the remainder; and further computing the one time pad from the remainder; and, wherein the step of computing the one time pad from the at least one other pad result at the at least one other location comprises the steps of:

dividing the at least one other pad result by the large prime number;

taking a second remainder; and further computing the one time pad from the second remainder.

16. The method in accordance with claim 9, wherein the step of computing the one time pad from the at least one other recipe at the at least one other location comprises the steps of:

raising the at least one other recipe to the at least one random number at the first location to produce a first pad result; and computing the one time pad from the first pad result at the first location.

17. A method for creating an identical one time pad at two stations, the method comprising:

generating a first random number at a first station;

generating a first computational result at the first station using a relationship that includes a primitive raised to the power of a random number, the first random number being used as the random number to which the primitive is raised to the power of;

generating a second random number at a second station;

generating a second computational result at the second station using the relationship, the second random number being used as the random number to which the primitive is raised to the power of;

sending the first computational result from the first station to the second station;

sending the second computational result from the second station to the first station; and independently generating an identical one time pad at the first and second stations using the relationship and the first and second computational results, the primitive being raised to a power that includes the product of the first and second random numbers.

18. The method of claim 17, wherein using the recipe includes using the relationship $r = F(g^x \bmod p)$, wherein:

r is the relationship;

g is a primitive mod p;

p is a large prime number;

x is the random number; and

F is a function for further computing the relationship.

19. The method of claim 18, wherein independently generating a one time pad at the first station includes raising the second computational result to a power of the first random number and then dividing by "p," the result generated being represented by the relationship wherein x includes a number that is the product of the first and second random numbers.

20. A method for encrypting data using one time pad at two stations, the method comprising:

generating a result "r1" using the relationship r1=F ($g^x$ mod p) at a first station; wherein:
 r1 is the relationship;
 g is a primitive mod p;
 p is a large prime number;
 x is a first random number generated at the first station; and
 F is a function for further computing the relationship;
generating a result "r2" using the relationship r2=F ($g^y$ mod p) at a first station; wherein:
 r2 is the relationship;
 g is the primitive mod p used at the first station;
 p is the large prime number used at the first station;
 y is a second random number generated at the second station; and
 F is the function for further computing the relationship used at the first station;
sending the result r1 from the first station to the second station;
sending the result r2 from the second station to the first station;
using the results r1 and r2 at the first and second stations and calculating a one time pad "r" at the first and second stations from the relationship r=F ($g^{xy}$ mod p);
encrypting data at the first station using the generated one time pad and sending the data to the second station; and
decrypting the data at the second station using the generated one time pad.

* * * * *

UNITED STATES PATENT AND TRADEMARK OFFICE
CERTIFICATE OF CORRECTION

PATENT NO. : 6,337,910  
DATED : January 8, 2002  
INVENTOR(S) : Goff et al.

Page 1 of 1

It is certified that error appears in the above-identified patent and that said Letters Patent is hereby corrected as shown below:

<u>Column 5,</u>
Lines 23 and 55, "station" should read -- stations --.

Signed and Sealed this

Seventh Day of May, 2002

*Attest:*

JAMES E. ROGAN
*Director of the United States Patent and Trademark Office*

*Attesting Officer*